(12) United States Patent
Kerr et al.

(10) Patent No.: US 8,606,886 B2
(45) Date of Patent: Dec. 10, 2013

(54) SYSTEM FOR CONVERSION BETWEEN PHYSICAL MACHINES, VIRTUAL MACHINES AND MACHINE IMAGES

(75) Inventors: Kenneth Kerr, Langley (CA); Ari Glaizel, Vaughan (CA); Stephen Pollack, Toronto (CA); Tony Ponzo, Scarborough (CA)

(73) Assignee: Novell, Inc., Provo, UT (US)

( * ) Notice: Subject to any disclaimer, the term of this patent is extended or adjusted under 35 U.S.C. 154(b) by 1403 days.

(21) Appl. No.: 11/257,009

(22) Filed: Oct. 25, 2005

(65) Prior Publication Data

US 2006/0089995 A1   Apr. 27, 2006

(30) Foreign Application Priority Data

Oct. 26, 2004   (CA) ..................................... 2486103

(51) Int. Cl.
*G06F 15/177*   (2006.01)

(52) U.S. Cl.
USPC ................ 709/220; 709/226; 718/1; 718/104

(58) Field of Classification Search
USPC ...................... 709/220–222, 226–230; 718/1, 718/104–105
See application file for complete search history.

(56) References Cited

U.S. PATENT DOCUMENTS

| | | | |
|---|---|---|---|
| 5,404,527 A | 4/1995 | Irwin et al. | |
| 5,881,131 A | 3/1999 | Farris et al. | |
| 6,073,222 A * | 6/2000 | Ohran | 711/162 |
| 6,279,001 B1 * | 8/2001 | DeBettencourt et al. | 709/221 |
| 6,356,915 B1 | 3/2002 | Chtchetkine et al. | |
| 6,658,465 B1 | 12/2003 | Touboul | |
| 6,763,458 B1 | 7/2004 | Watanabe | |
| 6,854,009 B1 | 2/2005 | Hughes | |
| 6,889,376 B1 * | 5/2005 | Barritz et al. | 717/175 |
| 7,356,679 B1 * | 4/2008 | Le et al. | 713/1 |
| 2003/0126202 A1 | 7/2003 | Watt | |
| 2003/0191911 A1 | 10/2003 | Kleinschnitz, Jr. et al. | |
| 2003/0192039 A1 | 10/2003 | McConnell | |

OTHER PUBLICATIONS

Canadian Intellectual Property Office, Office Action, Application No. 2,524,549, Dec. 7, 2009, Gatineau, Quebec, Canada.
Canadian Intellectual Property Office, Office Action, Application No. 2,524,549, Aug. 9, 2010, Gatineau, Quebec, Canada.
Canadian Intellectual Property Office, Office Action, Application No. 2,524,549, Feb. 28, 2011, Gatineau, Quebec, Canada.
Canadian Patent Office, Office Action dated Mar. 29, 2012, CA patent application No. 2,524,549.

* cited by examiner

*Primary Examiner* — Patrice Winder
*Assistant Examiner* — Nam Tran
(74) *Attorney, Agent, or Firm* — Borden Ladner Gervais LLP; Neil Henderson

(57) ABSTRACT

A system and method for converting machines from one form to another. For example a virtual machine may be moved to a physical machine or vice versa. Conversions may also be performed with images. An image is a static datastore of the state of a machine at a given time. All conversions are achieved by pushing a job containing information on the actions to be performed to a controller. A controller resides on the machine where the actions must take place and executes and reports on the status of the job.

22 Claims, 7 Drawing Sheets

SYSTEM FOR CONVERSION BETWEEN PHYSICAL MACHINES, VIRTUAL MACHINES AND MACHINE IMAGES

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

Computing systems are growing rapidly in size and complexity. Many businesses have data centers consisting of a multitude of servers. In such an environment servers will have different configurations of hardware and software, including operating systems.

One of the problems in managing a data center is moving an Operating System, related applications and data between servers to provide optimal use of the servers. Moving an Operating System, related applications and data from a source server to a target server traditionally requires that all software on the source server be reinstalled on the target server. This is often not trivial. The source server may have legacy applications that cannot be reinstalled. The source server and target server may also differ in device drivers and connections to peripherals. Typically the individual performing the transfer must have direct contact with the source and target machines to insert media and enter commands.

SUMMARY OF THE INVENTION

Some embodiments of the present invention are directed to a system for remote conversion between machines, the system comprising;
a) a machine conversion engine; and
b) a job management engine operatively coupled to the machine conversion engine.

Some embodiments of the present invention are directed to a method for remote conversion between machines, the method comprising the steps of: discovering the machines, taking control of the machines and installing controllers if needed on the machines to facilitate the conversion.

BRIEF DESCRIPTION OF THE DRAWINGS

For a better understanding of the present invention, and to show more clearly how it may be carried into effect, reference will now be made, by way of example, to the accompanying drawings which aid in understanding an embodiment of the present invention and in which.

DETAILED DESCRIPTION OF EMBODIMENTS OF THE INVENTION

Figure 1:
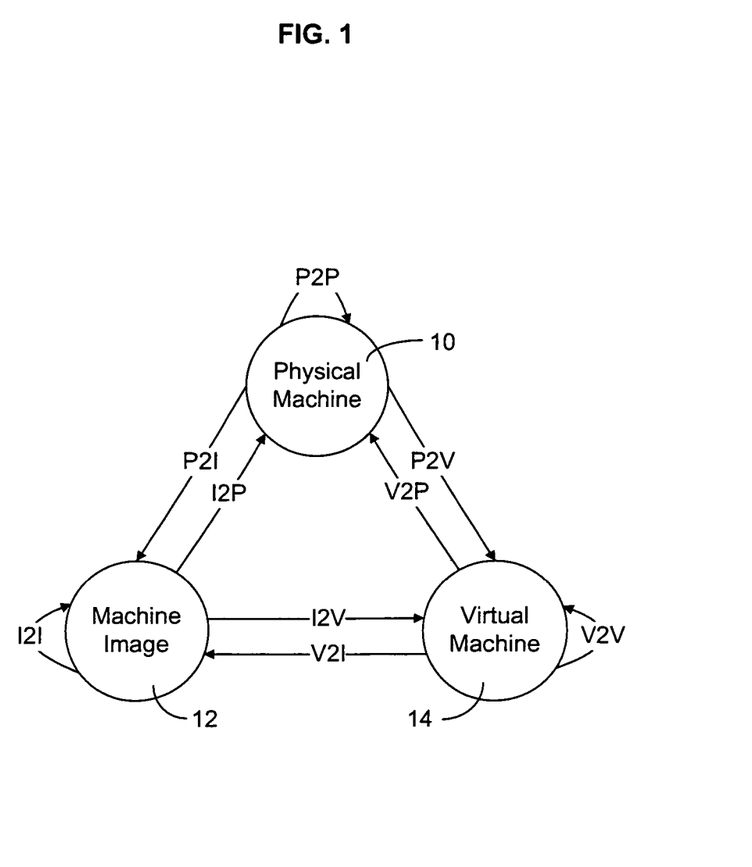
FIG. 1 is a block diagram illustrating the conversions between machines.

Referring first to FIG. 1 a block diagram illustrating the conversions between machines is shown. There are three types of machines, Physical 10, Virtual 14 and Image 12. Physical machines 10 are servers upon which an operating system and its related software applications run. Virtual machines 14 emulate a specific environment and run on virtual machine server software. For example, some virtual machines 14 may run on a version of Linux, others on versions of Windows. Through the use of virtual server software such as ESX and GSX provided by VMware Inc., and Microsoft Virtual Server (hereinafter referred to as MSVS), multiple virtual machines 14 may be deployed on a physical machine 10. Other virtual machines such as Xen which is open source, Virtual Iron and SW-Soft may also be supported by embodiments of the present invention. Machine Images 12 are stored copies of the state of a physical machine 10 or a virtual machine 14 at a specific time.

The conversion from a physical machine 10 (P) to a virtual machine 14 (V) is referred to as P2V. Similarly the conversion from a virtual machine 14 (V) to a machine image 12 (I) is referred to as V2I. In general X is used whenever the source or target is independent of the type of source or target. For example I2X refers to a conversion from a machine image to any other type, physical, virtual or image. In total there are nine possible conversion types as shown in FIG. 1. The intent of FIG. 1 is to illustrate that any machine may be converted from one to the other utilizing embodiments of the present invention.

Referring first to FIG. 1 a block diagram illustrating the conversions between machines is shown. There are three types of machines, Physical 10, Virtual 14 and Image 12. Physical machines 10 are servers upon which an operating system and its related software applications run. Virtual machines 14 emulate a specific environment and run on virtual machine server software. For example, some virtual machines 14 may run on a version of Linux, others on versions of Windows. Through the use of ESX virtual server software and GSX virtual server software provided by VMWARE INC., and MICROSOFT Virtual Server software (hereinafter referred to as MSVS), multiple virtual machines 14 may be deployed on a physical machine 10. Other products that may be supported by the present invention include XEN virtual machines software, VIRTUAL IRON virtual machine software and SW-SOFT virtual machine software Machine Images 12 are stored copies of the state of a physical machine 10 or a virtual machine 14 at a specific time.

Figure 2:
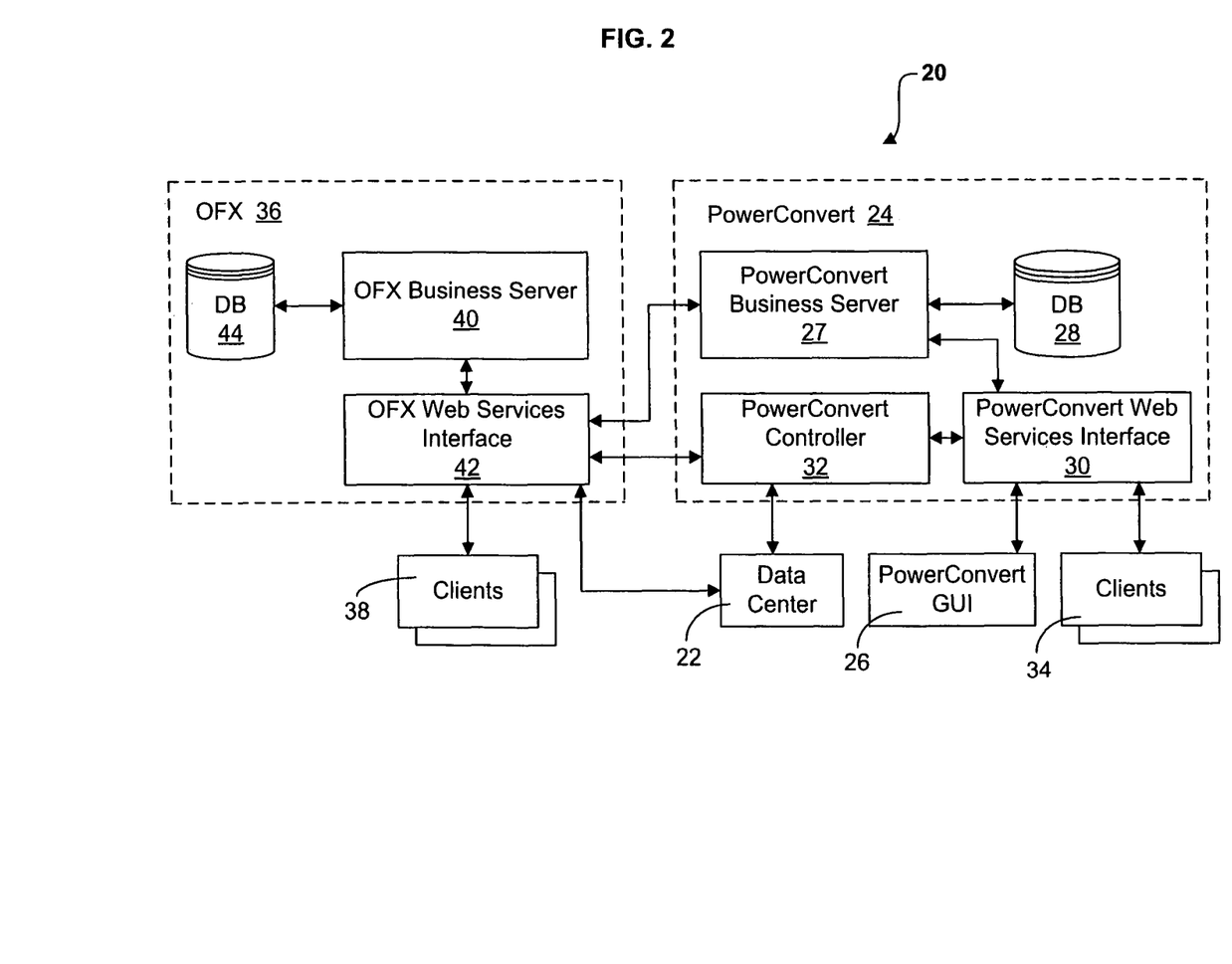
FIG. 2 is a block diagram of a system utilizing an embodiment of the present invention.

The conversion between machines is directed by PowerConvert 24. PowerConvert 24 resides on a server and has a distinct URL. Through the use of a PowerConvert Graphical User Interface (GUI) 26, a user may manage the movement of operating systems, applications and data between machines 10, 12 and 14 residing in a network of machines shown as data center 22. PowerConvert 24 obtains information on machines within data center 22 as selected by the user through GUI 26 and allows the user to move operating systems, applications and data between machines.

PowerConvert 24 comprises four main components: PowerConvert Business Server 27, Database 28, PowerConvert Web Services Interface 30, and PowerConvert Controller 32. PowerConvert Business Server 27 handles all requests to convert from a source machine to a target machine. In database 28 it stores archived operations and device driver information. Database 28 contains information of a set of device drivers necessary when converting a machine. Users and client applications 34 communicate with the PowerConvert Business Server 27 through PowerConvert Web Services Interface 30. In one embodiment PowerConvert Web Services Interface 30 utilizes Simple Object Access Protocol (SOAP) over Hypertext Transfer Protocol (HTTP) to provide a standard interface. PowerConvert Controller 32 is an instance of an OFX controller 54 (see FIG. 3), but its role is specialized. It is responsible for running discovery jobs, and jobs that guide the overall conversion process, which includes deploying other controllers to remote machines, when necessary. Primarily, it is responsible for handling any requests to PowerConvert 24 that cannot be fulfilled synchronously in the time of a typical http request/response.

OFX 36 controls and reports on the jobs requested by PowerConvert 24 and client applications 38. OFX 36 resides on a server and has a distinct URL. In essence OFX is a generic job management engine that remotely executes and monitors jobs through OFX controllers 54 (see FIG. 3). Applications such as PowerConvert 24 can utilize OFX functionality. The core of OFX 36 is OFX Business Server 40 which remotely executes and monitors the jobs through OFX controllers. OFX Business Server 40 is passive; it is a web server and responds to communication from OFX Web Services Interface 42. In one embodiment OFX Web Services Interface 42 utilizes Simple Object Access Protocol (SOAP) over Hypertext Transfer Protocol (HTTP) to provide a standard interface. OFX Business Server 40 stores all information on requests, the status of requests and machine configuration information in a database 44. In operation OFX Business Server 40 receives information on the status of request from OFX Web Services Interface 42 through OFX controllers 54 (see FIG. 3) installed on machines in data center 22.

Figure 3:
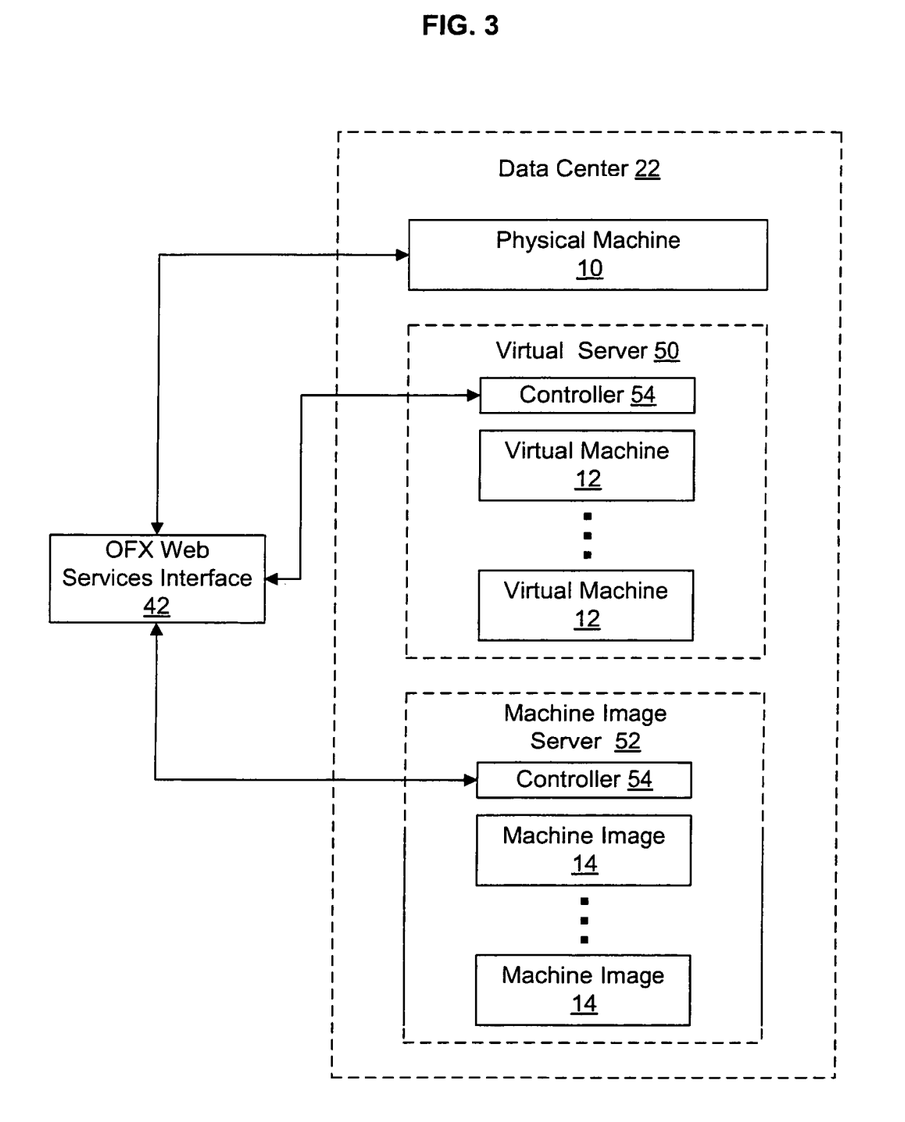
FIG. 3 is a block diagram of a data center.

Referring now to FIG. 3, a block diagram of a data center 22 is shown. Data center 22 is a repository of various types of machines in various numbers. In the example shown there is a physical machine 10, a virtual server 50 hosting a plurality of virtual machines 12 and a machine image server 52 hosting a plurality of machine images 14. A virtual server 50 is a computer running virtual server software such as MSVS, ESX, or GSX. Through the use of virtual server software, multiple virtual machines may exist. Machine image server 52 is a computer that controls the storage of a number of machine images 14. Generically, a machine container is either a Virtual Server 50 or a Machine Image Server 52 (see FIG. 3). Also, the term contained machine is used when making reference to either a virtual machine or a machine image.

PowerConvert 24 is a fully automated solution for OS portability. That is PowerConvert 24 can move the entire contents of a machine, including its operating system, applications and data to another machine. PowerConvert 24 will convert a source machine to a target machine. As discussed earlier, the types of source and target machines are Physical (P), Virtual (V), and Image (I). The steps required for each of the nine possible conversion types are illustrated in Table 1 below. Note that the first four rows refer to discovery steps. Discovery steps are prerequisites to the conversion taking place. If the desired source and target machines cannot be discovered, the conversion will not take place.

Depending on the source machine and the target machine types used in a conversion, the actual steps used in the conversion process differ. Typically, either a step can be omitted because it is not needed, or a different step needs to be inserted because of the special processing involved for that conversion type.

There are some prerequisites before the conversion can begin. First, the appropriate source and target machines must be discovered. Next, the user must initiate and configure the parameters that define the conversion process. By default, the target machine will be configured with essentially the same properties as the source machine. This includes the hostname, amount of RAM, network configuration, number and sizes of disks, and other information. Using PowerConvert GUI 26, the user then modifies the configuration of the target machine to suit their needs. This may include changing the hostname or changing the memory size of the target machine.

The conversion process is defined in a set of OFX jobs and actions that run on various OFX controllers 54 installed on machines throughout the data center.

The conversion process is guided by a job running on PowerConvert Controller 32. Each action (or step) in the job is run in sequence. PowerConvert Controller 32 cannot be expected to perform the entire conversion process, since the conversion is almost always distributed among several machines in the data center. Whenever the 'next' step in the conversion process needs to be run on a remote machine (for example, an ESX server on which a virtual machine will be created), it is the responsibility of the job running on PowerConvert Controller 32 to schedule the appropriate job to run on the appropriate OFX controller 54 (see FIG. 3). It does this by calling OFX 36.

Table 1 below indicates which steps need to be executed for the given conversion type.

TABLE 1

| | Discovery and PowerConvert Steps | | | | | | | | |
|---|---|---|---|---|---|---|---|---|---|
| Description | P2V | V2V | I2V | P2I | V2I | I2I | P2P | V2P | I2P |
| Discover Source | x | x | | x | x | | x | x | |
| Discover Source Machine Container | | | x | | | x | | | x |
| Discover Target Machine Container | x | x | x | x | x | x | | | |
| Discover Physical Target | | | | | | | x | x | x |
| Install Controller on Source Machine Container if necessary | | | x | | | x | | | x |
| Install Controller on Target machine Container if necessary | x | x | x | x | x | x | | | |
| Create VM | x | x | x | | | | | | |
| Take Control of Target Machine | x | x | x | | | | | | |

TABLE 1-continued

| Description | Discovery and PowerConvert Steps | | | | | | | | |
|---|---|---|---|---|---|---|---|---|---|
| | P2V | V2V | I2V | P2I | V2I | I2I | P2P | V2P | I2P |
| Create Volumes on Target | x | x | x | | | | x | x | x |
| Take Control of Source Machine | x | x | | x | x | | x | x | |
| Copy Volumes from Source to Target | x | x | x | x | x | x | x | x | x |
| Prepare OS to boot | x | x | x | | | | x | x | x |
| Restart Target | x | x | x | | | | x | x | x |
| Configure OS in Target | x | x | x | | | | x | x | x |
| Restart Source Machine (optional) | x | x | | x | x | | x | x | |

When PowerConvert 24 has been instructed to perform a conversion from a source machine to a target machine, it needs to provide instructions to and receive status information from those machines. This is done through OFX 36 via OFX Web Services Interface 42.

A user through the use of PowerConvert GUI 26, or an application through clients 34, opens a discover machine dialog and provides the machine identification such as a hostname or IP address and their credentials. This results in a job being scheduled on PowerConvert controller 32 to discover the information about the source machine. Once complete the information collected is forwarded to OFX 36 and stored in database 44. The discovery gathers all the necessary information needed for a conversion, as well as some other information that may be useful to the user. The information includes all of the machine's components: processors, disks, network adapters, the amount of memory on the machine, details about the operating system, and the network connections.

If the source machine is running Windows, PowerConvert 24 makes use of WMI (Windows Management Instrumentation) to remotely query the source machine. Since not all of the information that PowerConvert 24 needs is available through WMI, some other means to gather information are utilized. For example the physical address Media Access Control (MAC) of each Network Interface Card (NIC) and the properties of each disk volume are queried by deploying a small executable program to the source machine, running it, and copying back the data it generates. In the case of a Linux source machine, PowerConvert 24 communicates with the source machine using a secure protocol such as Secure Shell (SSH). PowerConvert 24 copies a small executable program to the source machine runs it, and copies back the data it generates. In one embodiment the data is provided as Extended Markup Language (XML).

Figure 4:
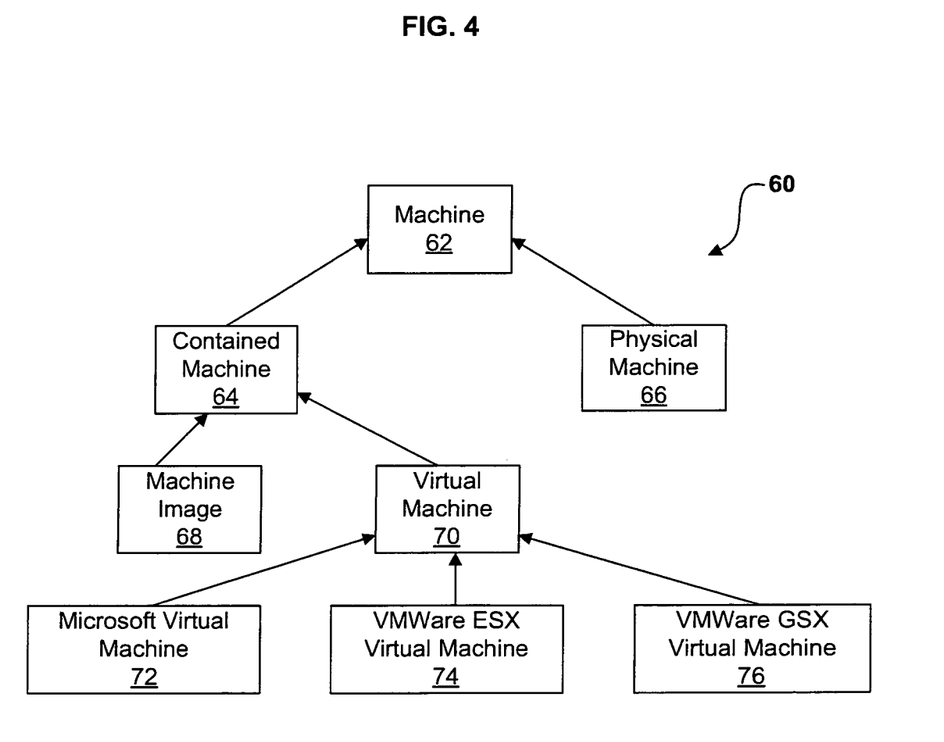
FIG. 4 is a block diagram illustrating machine hierarchy.

FIG. 4 is a block diagram illustrating machine object hierarchy shown generally as 60. Each machine type is defined in an XML schema. To aid the reader in understanding this mapping of machines, FIG. 3 describes the physical presence of the machines. FIG. 4 describes the hierarchical structure of how machines are described using XML. Machine 62 is the base type from which all other machine types are derived. There are two basic machine types, contained machine 64 and physical machine 66. A contained machine 64 may be either a machine image 68 or a virtual machine 70. Each derived type defines additional properties that are not present in its base type.

By way of example we illustrate three types of virtual machines 70. They are MICROSOFT Virtual Machine 72, VMWARE ESX Virtual Machine 74 and VMWARE GSX Virtual Machine 76. An example of the XML describing a VMWARE ESX Virtual Machine 74 is provided in Appendix 1.

In the case of conversion of a machine image 14 as a source machine, a discovery of its machine container occurs. Discovery of a machine container is a matter of determining whether the source machine has a certain property. That is, is it ESX virtual user software, GSX virtual user software, MSVS or an Image Server? After determining that the source machine is a machine container, queries are made to determine the properties of each machine container on the source machine. These properties include the version of the application (e.g. ESX virtual user software v2.5), any special devices that are configured on the machine (e.g. the list of virtual NICs) as well as a list all of the contained machines. If the source machine is a machine image 14 then the server on which it resides must be discovered, since a machine image 14 cannot be started, it cannot be discovered directly.

In the case of a conversion to a target virtual machine 12 or a machine image 14 a discovery of a machine container occurs. This discovery is the same as the previous discovery step mentioned for conversion of a source machine that is an image.

If the target machine is a physical machine 10 a discovery is made of the physical machine 10. In one embodiment this may require manual effort by the user, who must boot the machine using a PowerConvert boot CD, since it is expected that the physical machine may be bare. The boot CD contains a copy of Windows Preinstallation Environment (WinPE). The boot CD also contains a Windows application to assist the user to discover and register the machine with PowerConvert 24. The application prompts the user for the URL of PowerConvert 24 and the credentials with which to access it. This results in PowerConvert 24 instructing OFX 36 to create an OFX controller entry in database 44 for that machine. Next, an OFX controller 54 is downloaded from OFX 36 into the WinPE environment and installed and configured. A discovery job is then scheduled to run on this controller. The discovery job collects information about the physical machine such as: memory size, number of processors, speed of processors, number and sizes of disks including partitions and volumes and all available components, including network adapters and hard disk controllers. This machine information is stored by OFX 36 in database 44. In the case of Linux, a Linux ramdisk is used instead of the boot CD. All other steps remain the same.

Figure 5A:
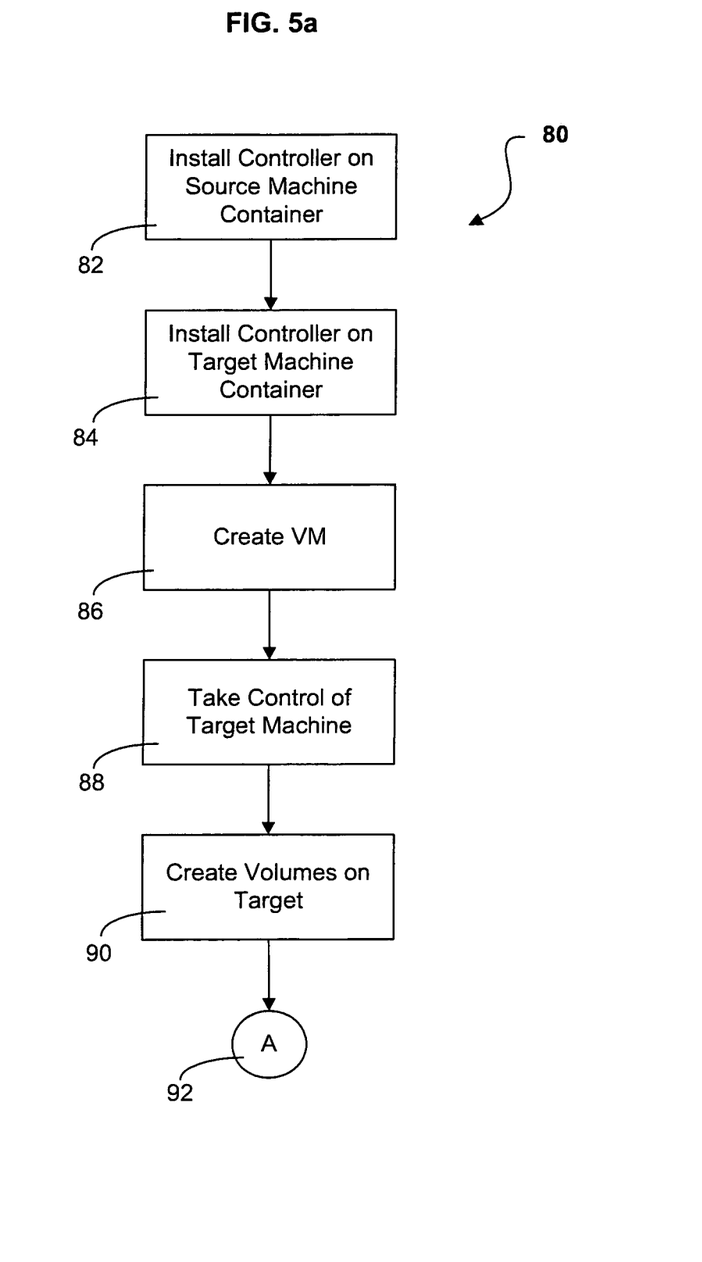
FIGS. 5a and 5b are a flow chart of the functionality of the PowerConvert.
Figure 5B:
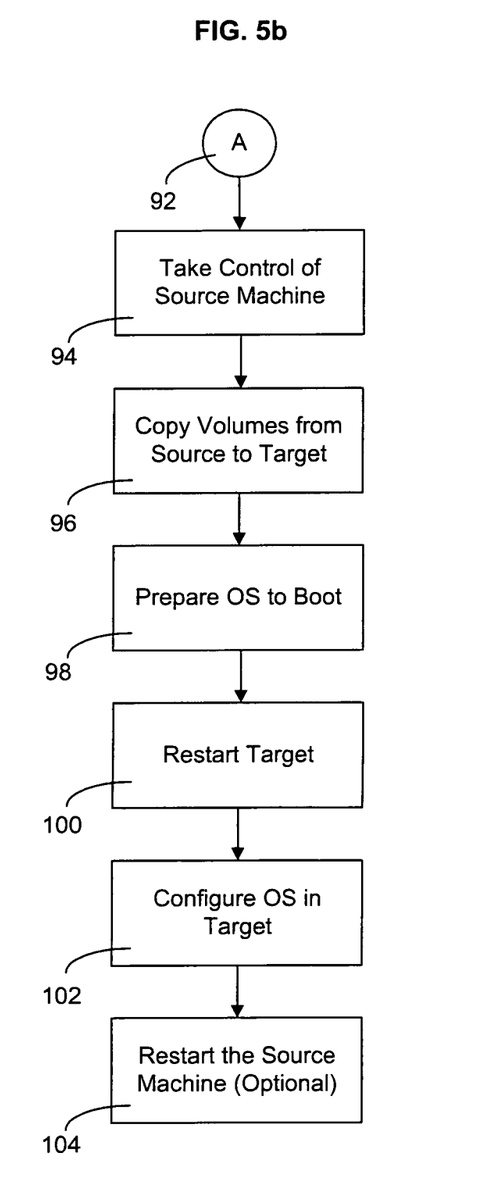

Referring now to FIGS. 5*a* and 5*b* a flow chart of the functionality of PowerConvert 24 is shown generally as 80. Flow chart 80 refers to the steps conducted by PowerConvert 24 should the above mentioned discovery be successful. If discovery is not successful the machines to be discovered will not be displayed to the user via a PowerConvert GUI 26 and thus conversion cannot be initiated.

Beginning at step 82, an OFX controller 54 is installed on the source machine container, if necessary. When the source machine for a conversion is a machine image 14, PowerConvert 24 manages machine image 14 by running jobs on its host machine image server 52. Thus, an OFX controller 54 must be deployed to the host machine image server 52. If the host machine image server 52 already has an OFX controller 54 installed on it from an earlier conversion, then this step can be skipped.

Moving now to step 84, if the target machine is a virtual machine 12 or a machine image 14, then PowerConvert 24 manages these machines by running jobs on the host Virtual Machine Server 50 (e.g., ESX virtual user software, GSX virtual user software or MSVS) or the Machine Image Server 52. Thus, an OFX controller 54 must be deployed to the host machine container. If the host machine container already has an OFX controller 54 installed on it from an earlier conversion, then this step can be skipped.

It is not uncommon for a host machine with an abundance of memory, disk, and CPU resources to be used for multiple purposes. For example, a host machine may be running both VMWARE, GSX virtual user software and MSVS. In this case, both machine container applications will share the same OFX controller 54 to run their jobs. There is no need to install a new instance of an OFX controller 54 for each machine container on the same host.

Similarly PowerConvert 24 might be installed on a host that is also running MSVS and an Image Server. In this case, PowerConvert Controller 32, which is actually an instance of an OFX Controller, can be used to run the jobs necessary for the machine containers.

Next is step 86. This step only needs to run in the case of converting to a virtual machine. When the target machine is a virtual machine, PowerConvert 24 runs a job on the host of the virtual machine server 50 to create and manage a virtual machine 12. Each type of virtual machine server 50 provides its own API that can be used to create and manage one of its virtual machines. The PowerConvert actions running in the jobs make calls to the virtual machine server 50 through the available API's.

By default, the properties of a virtual machine 12 are set to reflect the properties of the source machine. While configuring the conversion in the PowerConvert GUI 26, the user has the option to adjust many of the properties of the new virtual machine 12 to make optimal use of the resources available. The following properties of a virtual machine 12 may be configured:
a) The display name (as used by the virtual machine server)
b) Memory (RAM)
c) Minimum memory size
d) Memory shares
e) Number and size of the hard disks
f) Hard disk controller types (IDE or SCSI)
g) Number of CPUs
h) CPU min and max, shares and affinity
i) Number of NICs and the mapping to a virtual adapter
Finally, the new virtual machine 12 is registered with the virtual server 50.

We now move to step 88. This step is run only in the case of conversion to a virtual machine. A virtual machine 12 has been created, but it cannot run because there is no operating system installed on the machine.

The OFX controller 54 on the virtual server 50 is responsible for running this job. In this job, the newly created virtual machine is modified so that it connects to a virtual CDROM, which contains a copy of the boot image (WinPE or Linux Ramdisk). Then the virtual machine is forced to reboot. When the machine restarts, it will boot from the CDROM. The boot image will load, and a controller 54 will be installed and configured.

In this step it is also possible to temporarily modify the memory footprint of the virtual machine for the purposes of running it under the control of PowerConvert 24. For example, it may be suitable for the user to configure the target virtual machine to run with 128 MB of RAM, but the overall conversion speed can be improved in some situations if the machine under control is given additional virtual memory to utilize.

There is no need to take control of a target physical machine during the conversion process, since this already happens during the discovery stage when the machine is booted from the CDROM.

Moving next to step 90, now that the VM has been created and is under the control of PowerConvert 24, disk partitions and volumes are created.

Moving next to step 94, PowerConvert 24 takes control of a source machine directly. The job runs in PowerConvert controller 32. The platform specific boot image is copied to the source machine. Next, the boot configuration file is backed up and modified to refer to a new boot image. Finally, the source machine is forced to reboot.

When the source machine reboots, it will boot from the new boot image. In one embodiment, the OFX controller 54 is contained in the boot image, so it does not need to be downloaded. Instead, it only needs to be configured. As soon as the machine boots into the boot image, the original boot loader configuration files are restored. This allows the machine to be restored back into its native operating system as soon as it is rebooted, even if it is rebooted in error.

Moving now to step 96 the source and target machines are ready to begin copying. If either the source or target machines are physical or virtual machines, they are running under control. That is, they are running within a boot image, with a controller configured. If either the source or target machines is a machine image, then the controller of the machine container's host is used. In any case, there are two controllers ready to handle the copying of files. A 'copy source' job is scheduled to run on the source machines controller, and a 'copy target' job is scheduled to run on the target machine's controller. In the jobs, one side binds to a network port and waits for a connection from the other side. Either the source or the target may be configured to listen on a port. In most cases, it does not matter since the conversion is taking place between two machines that are under control. Once a connection is made, the transfer can begin.

PowerConvert 24 uses a file-based copy process. The source side begins with the root folder of a given volume and traverses the file system reading each file and folder. As each file and folder is found, the source side writes it to the socket connection. The data is streamed across the network in the OFX Package format. On the target side, the OFX Package is read from the network connection, one file at a time. As each new file arrives, it is recreated on the target machine with all of its associated properties. The intention is to recreate each file and folder exactly as it was on the source machine. The file transfer continues for each volume that is configured to be copied. The user has the option of choosing not to copy one or more volumes, if so desired. Further, some files are not copied from the source to optimize the amount of data to transfer taking into account what can be recreated by the operating system on the target.

As mentioned earlier, PowerConvert 24 uses a file-based copy process. That is, each individual file and folder is copied from the source to the target. The alternative to this is an image-based copy. In an image-based copy, the entire contents of a file system are read from the disk byte-by-byte, regardless of the structure of the file system.

There are several advantages to using a file-based copy instead of an image-based copy, as follows:

1. Resizing of volumes. At configuration time, the user may decide that the size of a volume on the source machine is not optimal for the target machine.
   a) For example, the C: drive on a Windows source machine is 20 GB in size, and now near capacity. In this case, the corresponding volume on the target machine can be configured with an increased size of, say, 50 GB.
   b) Similarly, a volume on the source may be underutilized. It may be sized at 120 GB, but only ever uses about 10 GB. In this case, the corresponding volume on the target machine can be configured with a smaller size of, say, 20 GB.
2. Automatic defragmentation of the file system on the target machine. Any file on the source machine may be fragmented. That is, its data is not stored contiguously on the disk. During PowerConvert's file transfer step, files are being written to the target's disk one file at a time, each file will naturally occupy the next available sectors of the disk, since the disk starts off with a clean file system.
3. Filtering specific files so that they are not copied or are changed during the copy process. Files that can be recreated without copying, such as the swap file for the Windows operating system need not be copied, which often saves 1 GB or more of data.

Moving now to step 98, PowerConvert 24 prepares the operating system to boot while it is still under control. It is only at this time that PowerConvert 24 has full access to the operating system that has just completed copying from the source. The following steps are taken:

a) Update drivers. Device drivers are installed on the Operating System. The drivers installed are those that match the plug and play identification of the devices on the target machine, which are determined at machine discovery time. For devices such as mass storage devices, it is vital to update the drivers while the machine is under control, otherwise the machine may likely never be able to boot.
b) Update Hardware Abstraction Layer (HAL) and kernel files. HAL and kernel files are updated, if necessary.
c) Update boot configuration file (boot.ini or grub.conf or linux.conf) so that the new machine will boot from the appropriate partition.
d) Update hostname, as configured by the user.
e) Update network connections. At this time for Linux only; it needs to be done later for Windows.
f) Disable VMWARE tools, if necessary.
g) Disable MSVS additions, if necessary.
h) Update Windows services or Linux daemons, as configured by the user.

Moving now to step 100, the target virtual machine is restarted. This step runs on the target machine container. Its purpose is to 'undo' the take control. This involves undoing the temporary changes that were needed during the take control step, including the disconnection of the virtual CDROM and resetting the memory size back to the user configured amount. In the case of a physical machine, this step is run from PowerConvert controller 32. It schedules a job to run on the target physical machines OFX controller 54, and instructs it to reboot.

Step 102 only needs to run for Windows target machines. For Linux, the target machine is fully configured by the end of the Prepare OS to Boot step 98. This step runs within a small Windows service that is injected into the target earlier and does the following:
a) Restore mount points on volumes
b) Configure network connections
c) Generate new Session Id
d) Join a domain or workgroup, as configured by user
e) Restore NT4 file security Step 104 ends the process and is optional. This step brings the source machine out of the PowerConvert boot image and back into the native operating system. The user may want to 'move' a machine, instead of 'cloning' a machine. In this case, they may not want to restart the source machine, and the machine is left 'under control'. If the user does want their source machine restarted, then PowerConvert 24 will relinquish control of that machine by running a 'reboot' job on the controller while the machine is under control.

To aid the reader in understanding the function of OFX 36 we will now describe some OFX terms.

A device is a generic term for a physical or virtual device that can be controlled. Examples of devices would be a computer, a virtual machine, a software application, a network switch or a group of devices. Devices can be nested to form a hierarchy. Information on a device includes a Globally Unique ID (guid), a display name, a security descriptor and Extended Markup Language (XML) instance data. PowerConvert 24 extends the use of this instance data to store its own model of a machine object in XML format as discussed above with reference to FIG. 4.

An OFX job defines a set of actions. Jobs are executed by an OFX controller 54 and are versioned. Jobs may be scheduled against devices or controllers.

Actions provide implementation behavior for jobs. Actions allow developers and users to extend the use of OFX 36 with custom behavior for custom solutions and applications. Actions are implemented as dynamic link libraries and are reusable among jobs.

An OFX package is a binary format that is used for file distribution. It is similar in notion to a .tar file or a .zip file.

OFX packages may be used in several ways namely:
1. OFX Action packages. When OFX controller 54 needs to execute an action, it must load a specified .dll. This .dll and any dependent .dll's are archived in a package available for OFX controller 54 to download from OFX 36. In this scenario OFX controller 54 requires the .dll's with their names and content, but little else.
2. OFX Job packages. These typically contain data files that are needed during the execution of a job. Multiple job packages can be used in a job.
3. PowerConvert File Transfer. During a conversion using PowerConvert 24, all of the files from a source machine are copied across a network to a target machine. For each file transferred all of the file's properties are transferred with it so that the file can be recreated on the target machine exactly as it was on the source machine.
4. PowerConvert Image Server. When archiving machine images on an image server, for each file in the archive, all of its properties and contents are stored so that it can be recreated at some later time when the machine image is deployed to a target machine.

The same package format is used for both Windows and Linux and is portable to any operating system format.

The structure of a package comprises four main components, a Package Preamble, Package Headers, File Headers and Files. We will now describe each in turn.

A Package Preamble identifies the package version.

Package Headers consists of a set of zero or more Headers that pertain to the package as a whole. The format of Package Headers is as follows:

| Number of Headers | four bytes |
|---|---|
| Header 1 | variable size |
| ... | |
| Header n | |

Package Headers can be used by the package author to provide additional information or hints about the source or the contents. For example, a package header could provide a hint about the approximate number of files or the estimated size of the package. This gives the program reading the package enough information to estimate progress between 1% to 100%.

File Headers have the same format as Package Headers and consist of a set of zero or more Headers. The only difference from Package Headers is that the properties relate to a file, instead of the entire package. File Headers provide a great deal of flexibility as a new File Header can be added whenever the need arises to describe some additional property of a special file type. For example File Header names used in one embodiment may include:

| Attributes | An integer representation of the file attributes |
|---|---|
| CreationTime | An integer representation of the file creation time |
| LastWriteTime | An integer representation of the last modification time |
| Backup | Utilizes Windows backup semantics (Boolean) |

A Header can be used for either packages or files. A Header includes a name/value pair that describes a property of either the package or the file. Each header has a MustUnderstand Boolean flag. When writing a package the author sets this value to TRUE if the reader must understand the meaning of this header. When reading a package the reader must check this flag. If the reader does not understand the meaning of the header, it will fail. In describing headers and other components we will hereinafter be referring to "Length-prefixed UTF8 string", this is a short form for "Four byte length-prefixed eight bit Unicode transformation format encoded string". One format of a header is as follows:

| Name | Length-prefixed UTF8 string |
|---|---|
| Value | Length-prefixed UTF8 string |
| MustUnderstand | One byte (Boolean) |

The Files section consists of a sequence of File entries. The number of files in the package is never specified. Instead there exists a Boolean marker with the value TRUE before the beginning of each new File to indicate that a file follows. A Boolean marker with the value FALSE will follow the last file in the package. With this format the writer of a package does not need to pre-calculate the number of files in the package. This is beneficial during a file transfer between two machines. As each file is read from the disk, it can be immediately sent across the network to the target machine. Thus there is no need to wait until the package is fully assembled. The Files section may be embodied in a format as follows:

| MoreFlag | One byte (Boolean TRUE) |
|---|---|
| File 1 | Variable size |
| MoreFlag | One byte (Boolean TRUE) |
| File 2 | Variable size |
| ... | |
| MoreFlag | One byte (Boolean TRUE) |
| File n | Variable size |
| End of Files Marker | One byte (Boolean FALSE) |

Each File describes the properties and contents of a file or directory. A File structure is as follows:

| Full Name of File | Length-prefixed UTF8 string |
|---|---|
| Is Directory | One byte (Boolean) |
| File Length in Bytes | Eight bytes |
| File Headers | Variable Size |
| File Contents | Variable Size |

The OFX package format is designed to be flexible for the easy addition of extensions. For example, file compression can be added without changing the File format by adding a File Header with the type "compressed", for each file that required compression. On the target machine the package reader will know that the file is in a compressed format when it sees the "compressed" File Header.

We will now provide more detail on PowerConvert Web Services Interface 30 and OFX Web Services Interface 42.

Power Convert Web Services Interface 42 deals primarily with Operations and Machines. To deal with these it provides an Operations Web Service and a Machine Web Service. The Operation Web Service provides a wrapper around the OFX job information, especially with respect to tracking the relationship between all of the remote jobs that make up a single conversion process. Power Convert GUI 26 calls the Operations Web Service when it wants to check on the status of a conversion, using OperationWebService.GetOperation( ) The Operation Web Service also includes methods such as AbortOperation and DeleteOperation.

The Machine Web Service handles all requests related to machines, including:
a) GetMachine( ), to retrieve the machine properties
b) Discover( ), which schedules a job on PowerConvert Controller 32 to gather information about the specified machine, and add the results to OFX database 44.
c) Undiscover( ) which will remove the machine from OFX database 44.
d) ConvertToMachineContainer( ), which schedules a job on PowerConvert Controller 32 to convert a source machine to a contained machine (i.e. x2V or x2I).

OFX Web Services Interface 42 provides access to OFX Business Server 40. These Web services are organized into three groups: Installation/Setup, Controllers-Only and Runtime.

Installation/Setup web services are used to configure OFX 36 with jobs, actions and packages. These are primarily used at installation time. Examples of Installation/Setup web services are:
a) JobWebService allows the user to add, delete, modify and query job definitions including actions such as: AddJob, GetJob, GetJobs, DeleteJob and SetJob.
b) ActionTypeWebService allows the user to add, delete, modify and query ActionType definitions including actions such as: AddActionType, DeleteActionType, GetActionType and SetActionType.

c) PackageWebService allows the user to add, delete, modify and upload package definitions including actions such as: Addpackage, GetPackage, SetPackage and UploadPackage.
d) SchemaWebService provides a means for defining the structure, content and semantics of XML documents in more detail. This web service is used to add and get schemas and includes actions such as, AddSchema, GetSchema and GetSchemas.
e) ImportExportWebService is used to import jobs, action types, devices, schemas and packages into OFX 36. The input is an XML document that contains the definitions of one or more job, action types and packages. This web service will call each of JobWebService, ActionTypeWebService, DeviceWebService, SchemaWebService and PackageWebService as required.
f) ConfigurationWebService is used to get and set security descriptor fields in database 44. These include jobs, action types, devices, controllers and packages. Actions include GetRootSecurityDescriptor and SetRootSecurityDescriptor.

Controller-Only web services are used by OFX controllers 54. There are two types of Controller-Only web services, namely ControllerNotificationWebService and ControllerPackageDownload.

ControllerNotificationWebService is used by OFX controllers 54 to notify OFX 36 of the controller status and the status of the jobs they are running. The three operations are:
a) Startup, which provides notification to OFX 36 when OFX controller 54 starts.
b) Heartbeat, which is used by an OFX controller 54 to inform OFX 36 that it (the controller) is still running. An OFX controller 54 sends to OFX 36 a snapshot of any jobs that it is currently running. OFX 36 then sends the OFX controller 54 any new jobs that have been scheduled to run on the OFX controller 54. Typically this occurs every five seconds or so.
c) Shutdown, which provides notification to OFX 36 when an OFX controller 54 stops.

ControllerPackageDownload is used by OFX controllers 54 to download any packages that are required to execute a job. A job is never executed until an OFX controller 54 has successfully downloaded all of the dependent packages. Packages are defined by a guid and a version. When an OFX controller 54 downloads a package, the package is cached on disk, in case it is needed later to run another job that has the same package dependency.

Runtime Web Services are of three types, JobSchedulingWebService, ControllerWebService and DeviceWebService.

JobSchedulingWebService includes the following services:
a) ScheduleJob, which is used for defining a new job instance, along with input parameters and the device or controller for the job to be executed on.
b) GetScheduledJob, which returns information about the specified job. This includes the job status, the status of each action in the job and any input and output data.
c) GetControllerJobs, which returns all of the jobs related to a specific controller 54.
d) AbortJob, which aborts a running job.
e) DeleteJob, which is used to delete a scheduled job when it is no longer needed on the system.

ControllerWebService includes the following services:
a) AddController, which is used to define and configure a new OFX controller 54 just before the controller is deployed to a machine.
b) SetController, which is used for modifying the properties of controller 54.
c) DeleteController, which is used to delete a specified OFX controller 54 entry in the database.
d) GetController, which returns its properties and attributes of a specified controller.
e) GetControllers, which returns properties and attributes of all controllers 54.
f) GetControllerEventLogEntries, which returns the event log entries for OFX controller 54.
g) ClearControllerEventLogEntries, which clears the event log entries for OFX controller 54.

DeviceWebService allows the user to add, delete, modify and query device definitions. It includes services such as: AddDevice, SetDevice, GetDevice, GetDevices, GetDeviceIds, and DeleteDevice.

An example of a SOAP request and response for the service ControllerWebService.GetController follows. The fields in bold are placeholders that need to be replaced with actual values.

EXAMPLE

ControllerWebService.Getcontroller

```
POST /ofxweb/Controller.asmx HTTP/1.1
Host: shark.platespin.com
Content-Type: text/xml; charset=utf-8
Content-Length: length
SOAPAction: "http://schemas.platespin.com/ofx/ws/GetController"
<?xml version="1.0" encoding="utf-8"?>
<soap:Envelope xmlns:xsi="http://www.w3.org/2001/xmlSchema-
instance" xmlns:xsd="http://www.w3.org/2001/xmlSchema"
xmlns:soap="http://schemasxmlsoap.org/soap/envelope/">
  <soap:Body>
    <id
xmlns="http://schemas.platespin.com/ofx/ws/">string</id>
    <options
xmlns="http://schemas.platespin.com/ofx/ws/">Properties or Data
or SecurityDescriptor</options>
  </soap:Body>
</soap:Envelope>
HTTP/1.1 200 OK
Content-Type: text/xml; charset=utf-8
Content-Length: length
<?xml version="1.0" encoding="utf-8"?>
<soap:Envelope xmlns:xsi="http://www.w3.org/2001/xmlSchema-
instance" xmlns:xsd="http://www.w3.org/2001/xmlSchema"
xmlns:soap="http://schemasxmlsoap.org/soap/envelope/">
  <soap:Body>
    <controller id="string" status="Unknown or Running or
Stopped" dateCreated="dateTime" dateModified="dateTime"
bootFile="string" bootFromNetwork="boolean"
bootPlatform="Windows or Linux" bootExpected="boolean"
xmlns="http://schemas.platespin.com/ofx/ws/">
      <description>string</description>
      <data>xml</data>
      <macAddresses>
        <macAddress>string</macAddress>
        <macAddress>string</macAddress>
      </macAddresses>
      <securityDescriptor>base84Binary</securityDescriptor>
    </controller>
  </soap:Body>
</soap:Envelope>
```

Figure 6:
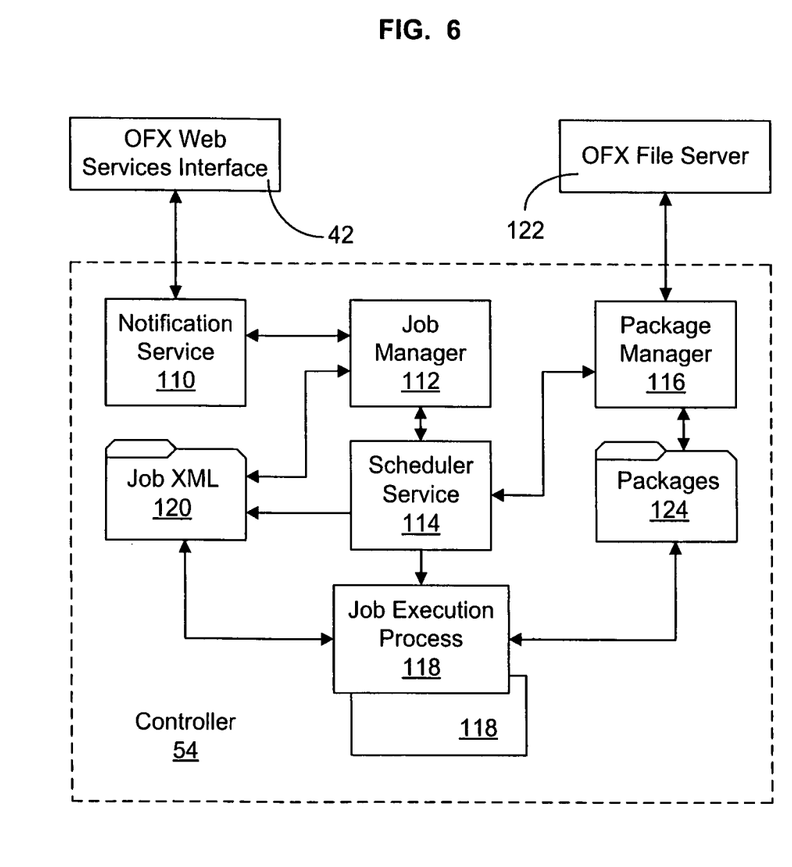
FIG. 6 is a block diagram of the components of an OFX controller.

Referring now to FIG. 6, a block diagram of the components of an OFX controller 54 is shown. An OFX controller 54 runs on a computer host to control one or more OFX devices, and it executes jobs provided to it by OFX 36. The design of OFX controllers 54 is independent of platform architecture and uses OFX Web Services Interface 42 to communicate with OFX 36. OFX controllers 54 are generic in that they know nothing about the actions they are executing. All the code needed to execute an action is downloaded on demand from OFX 36.

An OFX controller 54 for Windows is deployed from OFX 36 by using NetBIOS and WMI to copy OFX controller 54 to a remote machine and register it as a Windows Service. Similarly an OFX controller 54 for a Linux machine is deployed using the SSH protocol. In both cases, administrator credentials are required on the targeted machine.

At deployment time each OFX controller 54 is configured with:
a) The URL of OFX 36, which the OFX controller 54 uses to contact OFX 36.
b) A unique guid so that it can be identified by OFX 36.
c) A randomly generated symmetric encryption key for security. This "secret" along with a nonce value are used as a signature for the purpose of preventing replay attacks.

As shown in FIG. 6 an OFX controller 54 comprises five main components: notification service 110, job manager 112, scheduler service 114, package manager 116 and job execution process(es) 118.

Notification service 110 regularly checks in with OFX Business Server 40 through OFX Web Services Interface 42 to report status and to determine if any new jobs are waiting. This checking in is referred to as a "heartbeat" and occurs frequently, typically on the order of every five seconds but is user definable. On each heartbeat OFX controller 54 will send a snapshot of the status of each running job and the latest log file entries. Log file entries are maintained by the controller to indicate the status of a job. Examples of log file entries are; job received and package downloaded. A log file provides a running status of the job progression. Notification Service 110 will receive any new jobs that have been scheduled to run on OFX controller 54 since the last heartbeat. An OFX controller 54 will keep sending a snapshot of a given job at the heartbeat until the job has completed running. The benefit of such a design is that the dataflow across a network is minimized.

Job manager 112 is responsible for persisting all of the job XML files on disk. When notification service 110 receive a new job from OFX 36, it forwards that job to job manager 112 which will immediately persist that job XML to disk. Next, job manager 112 will notify scheduler service 114 that a new job has arrived. Also, when notification service 110 is preparing a heartbeat for OFX 36 it will ask job manager 112 for all the jobs that have been modified since the last successful heartbeat. As a job executes the job data will change. For example the status of an action will change from "NotRun" to "Running" when the action starts. Job manager 112 stores this information in the form of an XML file in job XML folder 120.

Scheduler service 114 is responsible for the running of each job. Scheduler service 114 schedules a job for a given time and controls a queue of jobs to be run. Before a job can be executed any dependent packages must first be downloaded, so package manager 116 is sent a request to download the packages. Each job has one or more associated packages, which contain everything needed to execute a job. The packages required to run a job are specified in the job XML. Scheduler service 114 executes a job by spawning a separate job execution process 118. Scheduler service 114 then waits for the process 118 to exit, at which time it will check the exit status of the process. If the job execution process 118 failed for any reason, scheduler service 114 is responsible for setting the job status to "Failed" by modifying the job XML in job XML folder 120. Finally, scheduler service 114 informs job manager 112 that the job has completed.

Each job is run in its own process 118 to protect any other running jobs. There is one new process created for each job that needs to be run. There is no limit to the number of jobs that can run concurrently on a single OFX controller 54, except for the usual memory, disk and CPU resource constraints of a machine.

The job execution process 118 is responsible for running the job. It does this by loading and executing each of the actions specified in the job. The job execution process is also responsible for setting the status of each action as it changes, as well as the overall job status. It is also responsible for flushing the job XML to the Job XML folder 120 at the completion of each action.

Package manager 116 communicates with an OFX file server 122 to download all packages specified in a job. OFX file server 122 is under the control of OFX 36. Package manager 116 will also store its own cache of packages that have been downloaded previously in packages folder 124. Packages are identified by a name (guid) and a version. Package manager 116 will cache packages in packages folder 124. As the number of packages to download for a specific job can vary, and their sizes can vary, any request to package manager 116 is asynchronous. Package manager 116 will notify scheduler service 114 when it completes downloading all of the packages for a specific job. Package manager 116 automatically handles retries, in the case that the download of a package fails because of some temporary network difficulties.

To better illustrate the types of information utilized by OFX 36 we will now briefly describe the contents of database 44. In one embodiment database 44 is a relational SQL database containing a plurality of tables. The main tables provide information on: packages, scheduled jobs, controllers, devices and actions. As an example of the structure of database 44, the tables for scheduled jobs and controllers would be linked together by controller id. The scheduled jobs table would include information about a job, such as a job id, a job version, a device id, status, date scheduled and other fields. The controllers table would include information about a controller such as: id, security descriptor, description, pointers to a bootfile, status, and other fields. It is not the intent of the inventors to restrict the use of embodiments of the present invention to a specific implementation of database 44 but rather to indicate that it serves as a repository for OFX 36.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. By way of example note that the inventors refer to the use of the Windows and Linux environments, specific VM products and specific tools such as WinPE and SSH. One skilled in the art will recognize that the present invention is structured to be portable across operating systems and easily adaptable to different computing environments and other virtual machine technology.

Embodiments of the present invention may be stored as instructions on a physical computer readable medium such as computer memory or computer readable disk.

APPENDIX 1

Machine XML Sample

```xml
<?xml version="1.0" encoding="utf-8" ?>
<VMwareESXVirtualMachine
xmlns:xsd="http://www.w3.org/2001/XMLSchema"
xmlns:xsi="http://www.w3.org/2001/XMLSchema-instance"
xmlns="http://schemas.platespin.com/athens/ws/">
<productVersion>Version5_1</productVersion>
<productVersionAtCreation>Version5_1</productVersionAtCreation>
<lastUpdateTime>2005-10-05T10:04:50.0619494-
04:00</lastUpdateTime>
<id>e6c2ef66-b9b9-4c63-bf16-6a57c66ace44</id>
<manufacturer>VMware, Inc.</manufacturer>
<model>VMware Virtual Platform</model>
<smbiosUUID>0ed94d56-dcc2-83a3-404a-6602a5041d94</smbiosUUID>
<serialNumber>VMware-56 4d d9 0e c2 dc a3 83-40 4a 66 02 a5 04
1d 94</serialNumber>
<operatingSystem xsi:type="MicrosoftOperatingSystem">
    <productVersion>Version5_1</productVersion>
<productVersionAtCreation>Version5_1</productVersionAtCreation>
    <type>Windows2000</type>
    <hostName>vm3.platespin.com</hostName>
    <address>192.168.80.102</address>
    <version>5.0.2195</version>
<networkConnections>
    <networkConnection>
        <name>Local Area Connection</name>
        <ipAddresses>
           <ipAddress>
              <address>192.168.80.102</address>
              <subnetMask>255.255.255.0</subnetMask>
           </ipAddress>
        </ipAddresses>
        <macAddress>00-0C-29-04-1D-94</macAddress>
        <dhcpEnabled>false</dhcpEnabled>
        <DefaultGateways>192.168.80.1</DefaultGateways>
        <DnsServers>192.168.220.10</DnsServers>
        <DnsServers>10.10.220.10</DnsServers>
        <WinsServers>192.168.50.66</WinsServers>
        <WinsServers>127.0.0.0</WinsServers>
        <peerDns>false</peerDns>
    </networkConnection>
</networkConnections>
<volumes>
    <volume>
        <fileSystem>NTFS</fileSystem>
        <size>3133796352</size>
<freeSpace>1624932352</freeSpace><serialNumber>8062f759</serial
Number>
<label />
    <mountPoints>C:</mountPoints>
    <partitions>\disk0\partition0\</partitions>
    <isDynamic>false</isDynamic>
    <isCompressed>false</isCompressed>
    </volume>
    <volume>
        <fileSystem>NTFS</fileSystem>
        <size>535805440</size>
        <freeSpace>530402816</freeSpace>
        <serialNumber>581d5335</serialNumber>
        <label>Compressed</label>
        <mountPoints>D:</mountPoints>
        <partitions>\disk1\partition0\</partitions>
         <isDynamic>false</isDynamic>
         <isCompressed>true</isCompressed>
    </volume>
</volumes>
<installedPrograms>
    <installedProgram>
        <displayName>WebFldrs</displayName>
        <size>2556</size>
        <version>9.50.7522</version>
        <category>SystemComponent</category>
    </installedProgram>
</installedPrograms>
<acpiSupported>true</acpiSupported>
<domain>PSACME</domain>
<servicePack>4.0</servicePack>
<windowsDirectory>C:\winnt</windowsDirectory>
<description />
```

APPENDIX 1-continued

Machine XML Sample

```xml
<pageFiles>
  <pageFile>
    <location>C:\pagefile.sys</location>
    <maxSize>805306368</maxSize>
  </pageFile>
</pageFiles>
<hardwareProfile>1</hardwareProfile>
<languageType>English</languageType>
<systemFileList>
  <systemFileInfo>
    <fileName>ntoskrnl.exe</fileName>
    <internalName>ntoskrnl.exe</internalName>
    <companyName>Microsoft Corporation</companyName>
    <productVersion>5.00.2195.6717</productVersion>
    <languageType>English</languageType>
  </systemFileInfo>
  <systemFileInfo>
    <fileName>ntkrnlpa.exe</fileName>
    <internalName>ntkrnlpa.exe</internalName>
    <companyName>Microsoft Corporation</companyName>
    <productVersion>5.00.2195.6717</productVersion>
    <languageType>English</languageType>
  </systemFileInfo>
  <systemFileInfo>
    <fileName>hal.dll</fileName>
    <internalName>halaacpi.dll</internalName>
    <companyName>Microsoft Corporation</companyName>
    <productVersion>5.00.2195.6691</productVersion>
    <languageType>English</languageType>
  </systemFileInfo>
</systemFileList>
<windowsServices>
  <windowsService>
    <name>Abiosdsk</name>
    <description />
    <displayName>Abiosdsk</displayName>
    <status>Stopped</status>
    <startMode>Disabled</startMode>
    <type>KernelDriver</type>
    <pathToExecutable />
  </windowsService>
  <windowsService>
    <name>abp480n5</name>
    <description />
    <displayName>abp480n5</displayName>
    <status>Stopped</status>
    <startMode>Disabled</startMode>
    <type>KernelDriver</type>
    <pathToExecutable />
  </windowsService>
- <!-- removed some for clarity
-->
</windowsServices>
<controlSet>1</controlSet>
</operatingSystem>
<memory>268435456</memory>
<status>Running</status>
<components>
  <component xsi:type="NetworkAdapter">
    <manufacturer>Advanced Micro Devices (AMD)</manufacturer>
    <model>AMD PCNET Family PCI Ethernet Adapter</model>
    <deviceId>0</deviceId>
    <pnpId>PCI\VEN_1022&DEV_2000&SUBSYS_20001022&REV_10\
      3&61AAA01&0&88</pnpId>
    <macAddress>00-0C-29-04-1D-94</macAddress>
  </component>
  <component xsi:type="DiskDrive">
    <manufacturer>(Standard disk drives)</manufacturer>
    <model>VMware Virtual disk SCSI Disk Device</model>
    <deviceId>\\.\PHYSICALDRIVE0</deviceId>
    <pnpId>SCSI\DISK&VEN_VMWARE&PROD_VIRTUAL_DISK&REV_1.0\
      4&5FCAAFC&0&000</pnpId>
    <size>3142056960</size>
    <type>SCSI</type>
    <partitions>
      <partition>
        <name>\disk0\partition0\</name>
        <size>3133799424</size>
```

APPENDIX 1-continued

Machine XML Sample

```
        <startingOffset>32256</startingOffset>
        <active>true</active>
        <partitionType>7</partitionType>
        <primary>true</primary>
      </partition>
    </partitions>
</component>
<component xsi:type="DiskDrive">
    <manufacturer>(Standard disk drives)</manufacturer>
    <model>VMware Virtual disk SCSI Disk Device</model>
    <deviceId>\\.\PHYSICALDRIVE1</deviceId>
    <pnpId>SCSI\DISK&VEN_VMWARE&PROD_VIRTUAL_DISK&REV_1.0\
        4&5FCAAFC&0&010</pnpId>
    <size>536870912</size>
    <type>SCSI</type>
    <partitions>
      <partition>
        <name>\disk1\partition0\</name>
        <size>535805952</size>
        <startingOffset>16384</startingOffset>
        <active>false</active>
        <partitionType>7</partitionType>
        <primary>true</primary>
      </partition>
    </partitions>
</component>
<component xsi:type="Processor">
    <manufacturer>GenuineIntel</manufacturer>
    <model>Intel(R) Xeon(TM) CPU 3.06GHz</model>
    <deviceId>CPU0</deviceId>
    <speed>3059</speed>
</component>
<component xsi:type="ScsiRaidController">
    <manufacturer>BusLogic</manufacturer>
    <model>BusLogic MultiMaster PCI SCSI Host Adapter</model>
    <deviceId>PCI\VEN_104B&DEV_1040&SUBSYS_1040104B&REV_01\
        3&61AAA01&0&80</deviceId>
    <pnpId>PCI\VEN_104B&DEV_1040&SUBSYS_1040104B&REV_01\
        3&61AAA01&0&80</pnpId>
    <driverName>buslogic</driverName>
</component>
</components>
<role>None</role>
<PlateSpinDiscovered>true</PlateSpinDiscovered>
<operatingSystemType>Windows2000</operatingSystemType>
<numberOfCpus>1</numberOfCpus>
<cpuMin>1</cpuMin>
<cpuMax>1</cpuMax>
</VMwareESXVirtualMachine>
```

We claim:

1. A system for remote conversion between machines, said system comprising:
a) a machine conversion engine configured to move data from a first machine to a second machine using a file-based copy process wherein each file on a first machine, including associated properties, is individually and separately copied from a first machine to a second machine such that a characteristic of the second machine and files on the second machine is different from a characteristic of the first machine and files on the first machine after execution of said file-based copy process; said machine conversion engine comprising means for remote conversion between machines, means for discovering said machines, means for taking control of said machines and means for installing controllers if needed on said machines to facilitate said conversion; and
b) a job management engine operatively coupled to said machine conversion engine configured to control the machine conversion engine.

2. The system of claim 1 wherein said conversion between machines is selected from the set consisting of: physical to physical, virtual to virtual, physical to virtual, and virtual to physical.

3. The system of claim 1 wherein said conversion between machines is physical to physical.

4. The system of claim 1 wherein said conversion between machines is virtual to virtual.

5. The system of claim 1 wherein said conversion between machines is physical to virtual.

6. The system of claim 1 wherein said conversion between machines is virtual to physical.

7. The system of claim 1 wherein said job management engine further comprises a business server, a web services interface, and a database.

8. The system of claim 7 further comprising a controller resident on a server, wherein said controller comprises a notification service operatively connected to said web services interface, a job manager operatively connected to said notification service, a scheduler service operatively connected to said job manager and a package manager operatively connected to said scheduler service and said web services interface.

9. The system of claim 1 further comprising means for installing a controller on a server.

10. The system of claim 9 further comprising means for installing and utilizing a controller on one or both of a source machine and a target machine to facilitate said conversion.

11. The system of claim 1 wherein said machines have different hardware and software configurations.

12. A method for remote conversion between machines, said method comprising the steps of: discovering said machines with a machine conversion engine, taking control of said machines and installing controllers if needed on said machines to facilitate said conversion, said method utilizing a direct file-based copy process wherein each file on a first machine, including associated properties, is individually and separately copied from a first machine to a second machine such that a characteristic of the second machine and files on the second machine is different from a characteristic of the first machine and files on the first machine after execution of said direct file-based copy process, wherein the direct file-based copy process is controlled by the machine conversion engine and wherein the method is implemented by a processor.

13. The method of claim 12 wherein said conversion between machines is selected from the set consisting of: physical to physical, virtual to virtual, physical to virtual, and virtual to physical.

14. The method of claim 12 wherein said conversion between machines is physical to physical.

15. The method of claim 12 wherein said conversion between machines is virtual to virtual.

16. The method of claim 12 wherein said conversion between machines is physical to virtual.

17. The method of claim 12 wherein said conversion between machines is virtual to physical.

18. The method of claim 12 wherein said machines have different hardware and software configurations.

19. A physical computer readable medium comprising instructions for the remote conversion between machines said instructions implementing the steps of: discovering said machines, taking control of said machines and installing controllers if needed on said machines to facilitate said conversion, said instructions utilizing a direct file-based copy process to copy data between said machines wherein said file based copy process comprises copying each individual file on a first machine, including associated properties, separately from the first machine to a second machine such that a characteristic of the second machine and files on the second machine is different from a characteristic of the first machine and files on the first machine after execution of said direct file-based copy process.

20. A system for remote conversion between machines, said system comprising:
   a machine conversion engine comprising:
      means for discovering said machines;
      means for taking control of said machines;
      means for installing controllers if needed on said machines to facilitate said conversion; and
      means for remote conversion between machines, wherein the means for remote conversion between machines is configured to move data from a first machine to a second machine by using a file-based copy process wherein each file on a first machine, including associated properties, is individually and separately copied from a first machine to a second machine such that a characteristic of the second machine and files on the second machine is different from a characteristic of the first machine and files on the first machine after execution of said file-based copy process; and
   a job management engine operatively coupled to said machine conversion engine configured to control the machine conversion engine.

21. The system of claim 20 wherein the characteristic of the files on the second machine that is configured differently from the characteristic of the files on the first machine is that the files on the second machine are de-fragmented.

22. The system of claim 20 wherein the characteristic of the second machine that is configured differently from the characteristic of the first machine is that the volume size on the second machine is different from the volume size on the first machine.

* * * * *